Patented Feb. 23, 1937

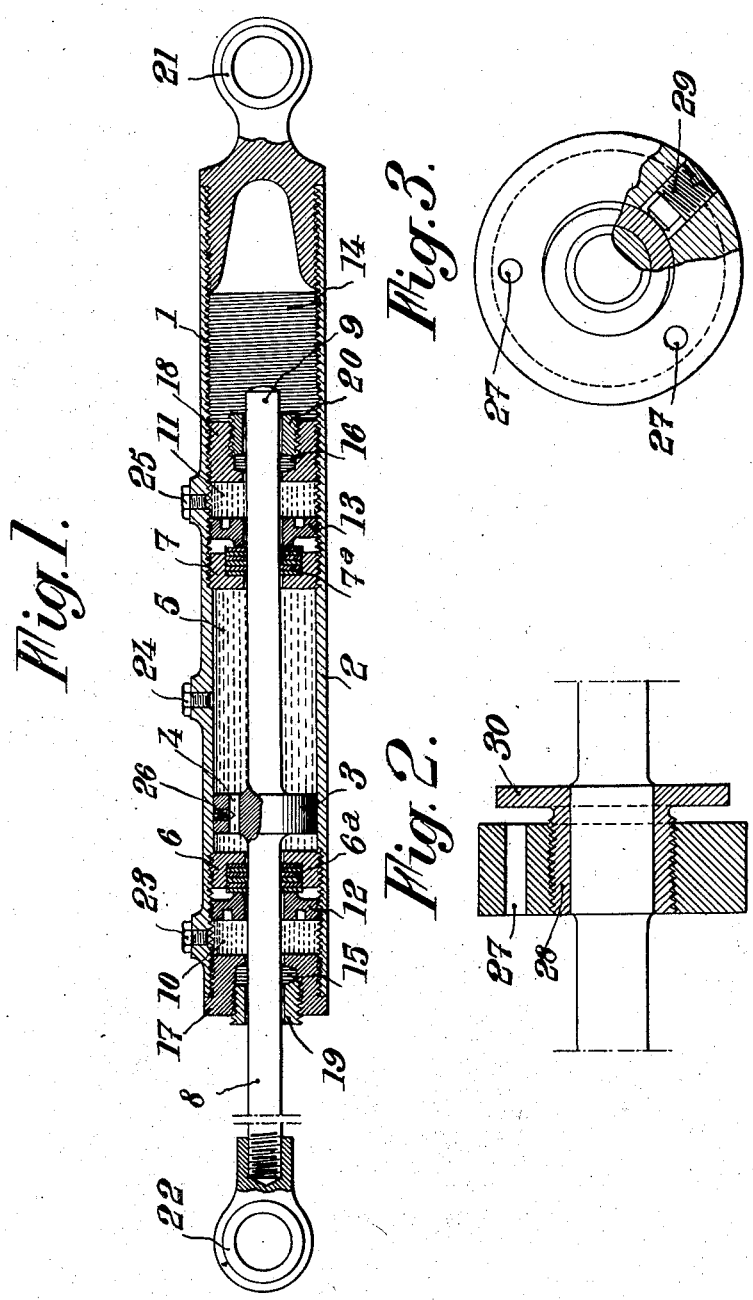

2,071,701

UNITED STATES PATENT OFFICE 2,071,701

SHOCK ABSORBING APPARATUS

Jacques Gustave Méjean, Chatou, France, assignor to Societe Bronzavia, Courbevoie, France, a society of France Application January 9, 1936, Serial No. 58,367
In France January 28, 1935

7 Claims. (Cl. 192—88)

It has been observed that, in airplanes flying at high speeds, there often occur vibrations of ailerons or other control surfaces. These vibrations, once they have set up, gradually become amplified to a considerable degree and they may become so dangerous as to involve the risk of breaking or tearing off of the control surface.

The object of the present invention is to provide a shock absorbing apparatus adapted to be interposed between the control surface and the element of the flying machine to which said control surface is connected, for instance between an aileron and a wing, with a view to eliminating such vibrations.

According to a first feature of the present invention, the damping of the vibrations is obtained by causing a piston provided with orifices of restricted section to slide in a cylinder filled with a liquid which is unfreezable within the range of temperatures under which the flying machine is intended to fly, said piston being provided with a rod on either side so as to work on the constant volume principle.

According to another feature of the invention, fluidtightness is obtained in two steps. I first ensure a certain fluidtightness, which may without any serious disadvantage be only relative, between the unfreezable liquid and an auxiliary liquid surrounding it, complete fluidtightness being then obtained between said auxiliary liquid and the surrounding medium through any suitable packing means, such for instance as a stuffing box of any conventional or other design interposed between said auxiliary liquid and the outside.

The shock absorbing device according to the present invention is uninfluenced by cold temperatures, since its damping action results from the passage of an unfreezable liquid through orifices of restricted section.

On the other hand, the auxiliary liquid, even if it is frozen, always performs its sealing function, which is based on the fact that it is uncompressible.

The shock absorbing apparatus according to the invention is also uninfluenced by variations of pressure or altitude.

I have found that it is advantageous to choose, as unfreezable liquid, toluene or an analogous body with which direct fluidtightness with respect to the outside of the absorber casing would be extremely difficult to obtain. From this point of view, it should be noted that the shock absorbing apparatus according to the present invention has perfect fluidtightness without introducing any resistance in the operation of the control surface in connection with which it is mounted.

Concerning the first step of fluidtightness, that is to say the obtainment of fluidtightness between the unfreezable liquid and the auxiliary liquid, it suffices to avoid the production of a mixture between these two liquids, which would considerably lessen the properties of resistance of the unfreezable liquid against the action of low temperatures.

Advantageously, I make use, for obtaining this relative fluidtightness, of a rubber capable of resisting the action of vapours of toluene, this rubber being, in a preferred embodiment of my invention, in the form of annular elements subjected to a relatively low compression, in order to avoid the creation of a resistance to the displacement of the piston rod with which said annular elements cooperate.

Direct fluidtightness with respect to the outside could not be obtained with such an arrangement because rubber capable of resisting the action of toluene vapours is available on the market only in the form of sheets and the compression of annular elements made from these sheets as would be necessary for obtaining this direct fluidtightness would produce a friction between these annular elements and the piston rod such that the operation of the shock absorbing apparatus would be hardly possible.

The second step of the obtainment of fluidtightness is obtained between the auxiliary liquid and the outside. I may, for instance, employ, for this purpose, a stuffing box of the usual type, which, in spite of the high pressure necessary for ensuring fluidtight packing, does not create an excessive resistance to the movements of the piston rod, if suitably devised.

It should be noted that the shock absorbing apparatus according to the present invention, which works on the constant volume principle through the resistance to the flow of a liquid through passages of restricted section, acts in an identical manner under the effect of identical actions whatever be the point of its path where the movable part (the piston) for instance is located, that is to say, whatever be the relative position of the control surface with which the device is associated with respect to the flying machine.

It should also be noted that the shock absorbing apparatus according to the present invention does not interfere with the operation of the control surface, as it is being actuated by the pilot, both from the point of view of faithfulness of the transmission and from the point of view of the facility of action.

On the contrary, as this device eliminates any detrimental vibratory effects exerted on the control surface, it renders the operation thereof very smooth and agreeable.

Other features of the present invention will result from the following description of some specific embodiments thereof.

Preferred embodiments of the present invention will be hereinafter described with reference to the accompanying drawing, given merely by way of example, and in which:

Fig. 1 is a diagrammatical sectional view of a shock absorbing apparatus made according to a preferred embodiment of the invention;

Fig. 2 is a partial axial section of a modification of the piston structure;

Fig. 3 is a front view, partly in section, corresponding to Fig. 2.

In the embodiment of Fig. 1, the body of the apparatus is shown at 1. The intermediate portion 2 of this body constitutes the cylinder in which moves a piston 3 provided with a conduit 4 of restricted section extending throughout it. The chamber in which the damping liquid 5, consisting for instance of toluene, is enclosed is stopped at either end by partitions 6 and 7, rigidly fixed to body 1.

Piston 3 is provided with two rods 8 and 9 disposed on either side thereof respectively, in such manner that the total volume of the chamber in which the damping liquid is enclosed remains constant when the piston moves.

On either side of the chamber containing the damping liquid there are provided chambers 10 and 11 filled with the auxiliary liquid, for example, heavy oil.

In order to prevent the two liquids from mixing together, I provide, around rods 8 and 9, a plurality of annular elements or discs 6a and 7a, piled upon one another, said annular elements being made of a special rubber (capable of resisting the action of toluene vapours) which is available on the market only in the form of sheets. These annular elements are slightly pressed together by members 12 and 13, which are for instance screwed in body 1.

Fluidtightness between chambers 10 and 11, filled with the auxiliary liquid, and, on the one hand the outside, and, on the other hand chamber 14, is obtained by means of stuffing boxes of a usual type, 15 and 16 respectively, housed in plugs 17 and 18 and strongly compressed by threaded members 19 and 20.

Body 1 carries a fixation element 21, for instance of the swivel type, and rod 8 carries a fixation element 22 of a similar kind, these elements 21 and 22 serving to fit the shock absorber to the parts of the flying machine between which it is to be interposed, for instance a wing and an aileron associated therewith.

Orifices 23, 24 and 25 are provided for filling the apparatus with the liquids above mentioned.

Through orifice 24 it is possible to adjust, by means of a screw 26 engaged in piston 3, the resistance exerted by conduit 4 to the flow of toluene therethrough.

In Figs. 2 and 3, I have shown a modification in the structure of the piston.

In this modification, the piston is provided with a plurality of conduits 27 extending therethrough, for instance three conduits 27 in the example shown by the drawing. A sleeve 28 is mounted with a force fit on the piston rod which extends throughout the whole length of cylindrical chamber 2. The piston is screwed on said sleeve 28. A screw 29, when tightened, determines the position of said piston. Sleeve 28 carries a flange 30.

By bringing screw 29 in register with orifice 24, it is possible to unscrew it from the outside, and then to turn the piston rod, the piston being held in fixed position, for instance by engaging the end of a screw-driver through orifice 24. In this way I vary the interval between flange 30 and the corresponding face of the piston. I can thus adjust the resistance to the flow of the liquid from one face of the piston to the opposite face thereof.

When the control surfaces of the flying machine are operated by the pilot, the shock absorbing apparatus according to the present invention does not produce any objectional resistance to the movement of said control surfaces. This results from the fact that ring-shaped elements 6a and 7a are but slightly compressed by elements 12 and 13 and the resistance offered by stuffing boxes 15 and 16 can be relatively small if the inner surfaces of said boxes are sufficiently well shaped.

If a very small amount of toluene happens to leak past the ring-shaped packing members 6a and 7a, this leakage is immediately stopped because of the resistance offered by the uncompressible cushion of auxiliary liquid. The same takes place when a small amount of auxiliary liquid happens to leak past the same packing members into the chamber reserved in the body of the apparatus for toluene.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A damping device for vibrations, comprising in combination a cylinder, a piston movable in said cylinder and dividing said cylinder into two chambers filled with an unfreezable liquid, a passage of restricted section connecting said chambers, a piston rod extending from each face of said piston, a pair of walls at each end of said cylinder having axial passages for permitting said piston rod to slide therethrough, each pair leaving between them a space filled by an auxiliary liquid different from said unfreezable liquid, means carried by the inner walls of said pairs for preventing said liquids from mixing together, and packing means, carried by the outer walls of said pairs, for preventing the auxiliary liquid from leaking out past said outer walls.

2. A shock absorber according to claim 1 further including means for adjusting the section of the restricted passage provided between said two chambers.

3. A shock absorber for use between a part of a flying machine and a control surface associated with said part, which comprises, in combination, a cylindrical body, a piston movable in said body provided with a conduit extending throughout it, a piston rod carried by each face of the piston, a partition rigidly fixed in said body on either side of said piston, each partition being provided with an axial passage for the corresponding piston rod, a plug closing each end of said body, each plug being provided with an axial hole for the corresponding piston rod, means for connecting one of said piston rods with one of the two above mentioned parts of the flying machine, means for connecting said cylindrical body with the other of said parts of the flying machine, an unfreezable liquid filling the whole of the space limited in said body by said partitions, an auxiliary liquid filling the spaces between said partitions and the corresponding plugs, packing means carried by said partitions for preventing, to a certain degree, said liquids from mixing together, and packing means, carried by said plugs, for strictly preventing the auxiliary liquid from leaking out past said plugs.

4. A shock absorber according to claim 1 in which the first mentioned means consist of a plurality of ring shaped discs of a material capable of resisting the action of the unfreezable liquid, and means for applying said discs against one another.

5. A shock absorber according to claim 1 in which the unfreezable liquid consists of toluene, the first mentioned means including a plurality of ring-shaped discs of rubber surrounding the piston rod, and means for pressing said discs together with a moderate strength, the second mentioned packing means consisting of stuffing boxes.

6. A shock absorber according to claim 3 further including means for adjusting the resistance afforded by said conduit to the flow of the first mentioned liquid therethrough.

7. A shock absorber according to claim 3 in which the two piston rods are integral together, further including a sleeve rigidly mounted on said common piston rod, a flange carried by said sleeve, the piston being screwed on said sleeve so that its conduit opens opposite said flange, and means for locking said piston in the desired relative position with respect to said flange, whereby it is possible to adjust the resistance offered to the flow of the first mentioned liquid through said conduit.

JACQUES GUSTAVE MÉJEAN.